United States Patent [19]

Thompson

[11] Patent Number: 4,856,221

[45] Date of Patent: Aug. 15, 1989

[54] FISHING ROD HOLDER

[76] Inventor: David M. Thompson, 834 Mantoloking Rd., Brick Town, N.J. 08723

[21] Appl. No.: 296,030

[22] Filed: Jan. 12, 1989

[51] Int. Cl.$^4$ .............................................. A01K 97/10
[52] U.S. Cl. .................................... 43/21.2; 211/70.8
[58] Field of Search ............... 43/21.2; 211/69.5, 60.1, 211/70.6, 70.7, 70.8; 248/121, 512

[56] References Cited

U.S. PATENT DOCUMENTS

| | | | |
|---|---|---|---|
| 2,580,625 | 1/1952 | Waltz | 43/21.2 |
| 2,721,680 | 10/1955 | Steckman | 43/21.2 |
| 3,487,947 | 1/1970 | Borar | 211/70.8 |
| 3,672,513 | 6/1972 | Riddle | 211/70.8 |
| 4,006,825 | 2/1977 | Austin | 211/70.8 |
| 4,582,203 | 4/1986 | Davis | 211/70.8 |
| 4,631,783 | 12/1986 | Hayashi | 211/70.6 |

Primary Examiner—Gene P. Crosby
Attorney, Agent, or Firm—Charles F. Gunderson

[57] ABSTRACT

A pair of bracket units are provided for holding a fishing pole or the like. The units are mounted on a solid surface and spaced slightly shorter than the length of the pole, with one bracket unit to hold the tip and one bracket unit to hold the base of the pole. Each unit has a flange secured to the solid surface for supporting the bracket unit projecting substantially perpendicular to the surface. The bracket units include an opening into which a flexible diaphragm will be centered and secured. Each flexible diaphragm has a centrally-located hold with slots in the diaphragm radiating out from the hole to the edges of the opening. The slotted diaphragm will flex to accomodate and hold each end of the pole in a rigid but cushioned manner.

4 Claims, 1 Drawing Sheet

U.S. Patent
Aug. 15, 1989
4,856,221
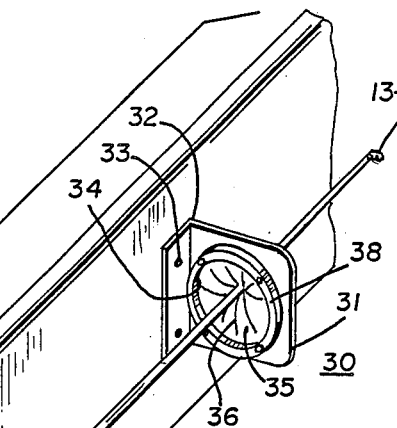
FIG. 2
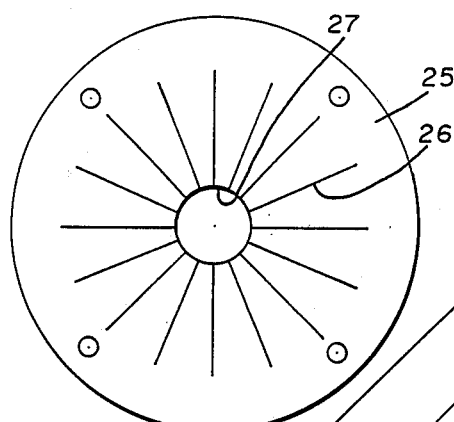
FIG. 1
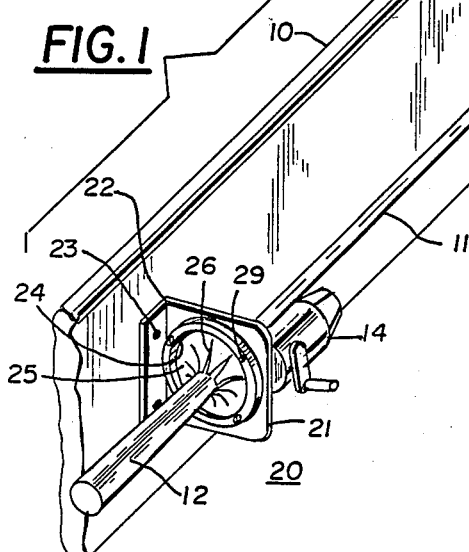
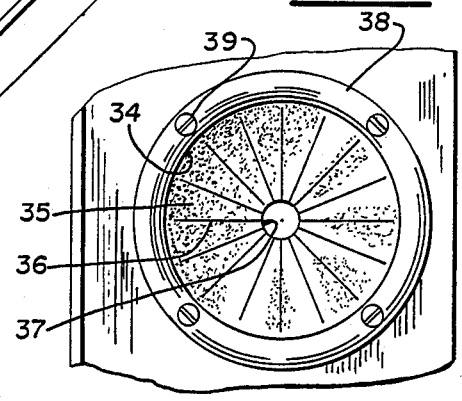
FIG. 3
FIG. 4
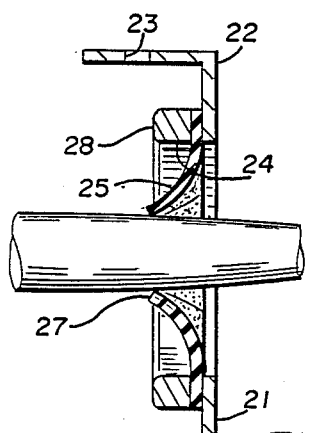
FIG. 5
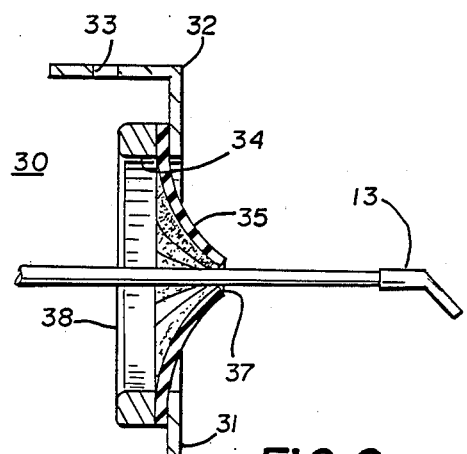
FIG. 6

# FISHING ROD HOLDER

BACKGROUND OF THE INVENTION

Fishing is a very-serious sport and pastime for very many people, and, as in almost all other sports, it requires certain gear. For the typical fisherman, this usually means some form of fishing pole, not to mention an almost endless array of reels, lines, lures, floats, sinkers, etc.

Considering the poles, they must be as light as possible while still being strong enough to bring in the fish one is trying to catch. They must also be flexible and resilient enough to bend when the fish begins to tug and try to get off the hook. In other words, an ideal fishing rod must have very special characteristics, and a fishing rod with the ideal combination of lightness, strength, and flexibility can be a work or art, and quite expensive.

On the other hand, in achieving its maximum effectiveness for its prime purpose, it becomes very delicate physically for any other purpose. It is not designed for and cannot take other stresses. It cannot be stepped on or hit with a hard object, or even roughly handled without potential damage. A fishing pole is no more suitable for use as a bat as a bat would be for a fishing pole.

Fishing rods are also awkward to handle when not actually in use. They are long and spindly, and hard to grasp anywhere but their handle. They can be stored at home safely enough, but when they must be carried to and from the fishing grounds they can be cumbersome and very-much in the way. They are hard to find a place for and usually end up lying around where other equipment may be dropped on them or they may be stepped on and broken or damaged.

This situation is magnified in a fishing boat to or from fishing grounds in a potentially heavy sea where fishermen and their gear may be bouncing around the boat.

It is therefore an object of this invention to provide special brackets for a fishing pole that will hold the pole in a fixed position, out of the way of other gear in a boat.

It is a further object of this invention to provide a device for holding a fishing pole that is easily accessible, and that permits the pole to be stored or removed for use in a very short time.

It is a further object of this invention to provide a mounting for a fishing pole that will hold the pole firmly under rough conditions but will cushion it against shock from any source.

SUMMARY OF THE INVENTION

A device for holding slender, delicate, elongated objects, such as fishing poles or the like has a pair of units mounted along a given surface. Each unit has a central portion mounted in an opening in a bracket supporting it away from the given surface. The central portion is formed of a resilient and flexible material, and has a small central opening with radial cuts extending from the central opening to the edges of the opening in the bracket. A mounting ring secures the resilient central portion to the edges of the bracket. One end of the fishing pole can be quickly and easily inserted through the small central opening of one of the units, with the radial portions of the material flexing to accomodate the end of the rod, and the other end of the rod can be fitted through the small central opening of the other unit, whoes radial portions will again flex to accomodate the other end of the rod to hold it securely and safely in place until it is removed.

BRIEF DESCRIPTION OF THE DRAWINGS

FIG. 1 shows an isometric view of the device supporting a fishing pole;

FIG. 2 shows a plan view of an individual holder;

FIG. 3 shows a plan view of an individual holder with its mounting ring;

FIG. 4 shows a side view, in cross section of one of the holder units;

FIG. 5 shows a side view, in cross section, of one unit holding one end of a fishing pole; and FIG. 6 shows a side view, in cross section, of the other unit holding the other end of the fishing pole.

DETAILED DESCRIPTION OF THE DRAWINGS

Referring now more particularly to FIG. 1, an isometric view of the entire unit is shown, mounted on the surface of a bulkhead, or the like, 10. This may be on a ship, and can be inside or outside of a cabin, or anywhere where the fishing rod 11 will be out of the way and as safe as possible from accidental damage.

The actual fishing rod holder has two units 20 and 30, spaced slightly less than the length of a rod apart, and secured to the mounting surface 10. The units are similar, if not identical. However, the unit 20 that is shown holding the handle of the fishing rod, may be larger and even stronger than the unit 30 that is shown holding the tip of the rod.

The unit 20, for example, has a projecting portion or bracket 21 that secured to, or is part of a flange 22 with holes 23 for suitable fasteners. The projecting portion 21 has an opening 24 that contains flexible diaphragm 25 with radial cuts 26 that actually hold the handle 12 of the fishing rod. These units will be more clearly illustrated in the remaining drawings, where similar elements are similarly numbered The unit 30 also has a projecting bracket 31, that is part of a mounting flange 32 with mounting holes 33. The opening 34 in the bracket again contains a flexible diaphragm 35 with cuts 36 radiating from a central opening to receive the tip 13 of the rod 11. A mounting ring 38 secures the diaphragm 35 to the bracket 31.

FIG. 2 shows a plan view of a typical flexible membrane 25, at nearly full size for a smaller handle, without the flange or mounting ring. This shows the radial cuts 26 extending from the center hole 27 to near the outer edge of the membrane. The holes near the outer edges are, of course, to accomodate the fasteners through the mounting ring, not shown here.

The circular shape shown here would be the obvious choice, although it could be of any shape from triangular or square up. The number of radial cuts is also a matter of choice. This may depend on the thickness or resiliency of the material, and the degree of flexing that will be necessary to accomodate the appropriate end of the rod. Obviously, the center portion must be able to recieve an end of a rod, and hold it securely from then on.

FIG. 3 shows a top view of another flexible membrane 35 under its mounting ring 38, which will be secured to the flange with fasteners 39. There are fewer radial cuts 36 shown here, and the center hole 37 is smaller, since it may only be intended to accomodate the tip of the rod.

FIG. 4 shows a cross section of the whole unit 30, with its bracket 31 and opening 34. The flexible membrane 35 is centered within the opening and the mounting ring 38 secures it to the bracket by means of fasteners 39. The flange 32 with its mounting holes 33 will secure the unit to its mounting surface. This is how it appears at rest waiting for a fishing rod.

FIG. 5 shows a cross section of a unit 20 in use, holding the handle 12 of a fishing rod. This is intended to show how the radial portions of 25 will be splayed out to accomodate the handle of a rod, for example. The springiness of the material chosen will be enough to grip the handle to hold it in place, yet resilient enough to flex to absorb minor shocks that may occur. The other elements of the unit are the same as before, but the outer end of the flange 21 has been wrapped around to reduce the danger of a sharp edge projecting from the mounting surface.

FIG. 6 shows a cross section of a unit 30 in use, holding the tip 13 of the fishing rod. This, again, shows some splaying of the radial portions of 35 to accomodate and hold the tip. The bracket 31 and the flange 32 with mounting holes 33 are clearly seen, as are the hole 37, the mounting ring 38, and the bolts 39.

The mounting rings 28 and 38, would be circular, if the holes in their repective brackets are circular. They should be rigid in comparison with the resilience of the membranes, and can be of plastic or metal.

The flanges can certainly be of metal, stamped for the necesary holes, and bent into shape. They may also be of heavy plastic, that can be formed into any desired shape, nicely rounded, and moulded in quantities.

Since fishing poles and the like come in all sorts of sizes and shapes, the sizes of the units, as noted, can obviously be varied, and used in any combination to accomodate any of the innumerable sizes and shapes of fishing poles. As noted, the shapes of the openings 24 and 34, as well as the central openings or holes 27 and 37, may be varied to acccomodate special shapes of rods or handles.

Movable, temporary fastenings, not shown, would be an obvious variation, and can also be provided in any manner, with snaps or "velcro" fasteners, for example, to change the spacing or the types of the units.

I claim:

1. A fishing pole holder comprising a pair of units mounted on a relatively flat surface; the spacing of said units being less than the length of said fishing pole; each of said units comprising a flange having a means for mounting on said surface; each of said flanges supporting a bracket at substantially right angles to said surface; each of said brackets having a central opening; each of said central openings supporting a resillient diaphragm with a centrally-located hole, and radial cuts from said centrally-located hole to the edges of said central openings; and means for securing said resilient diaphragms to said brackets; said radial cuts permitting said flexible diaphragm to expand to accomodate and secure each end of said fishing rod in a cushioned manner.

2. A fishing pole holder as in claim 1 wherein said flanges and brackets are formed of rigid material to support said resilient diaphragm.

3. A fishing pole holder as in claim 1 wherein said central openings are circular.

4. A fishing pole holder as in claim 1 wherein said means for securing said resilient diaphragms to said brachets comprises a ring of rigid material shaped to conform to said central opening, and said resilient diaphragm is secured between said ring and said bracket.

* * * * *